United States Patent
Whetten et al.

(10) Patent No.: US 9,356,342 B1
(45) Date of Patent: May 31, 2016

(54) METHOD FOR DETERMINING AN ANTENNA PATTERN IN A REVERBERANT ENVIRONMENT

(75) Inventors: Dennis Whetten, Lynnwood, WA (US); Dennis M. Lewis, Lynnwood, WA (US); Kenneth P. Kirchoff, Redmond, WA (US)

(73) Assignee: The Boeing Company, Chicago, IL (US)

( * ) Notice: Subject to any disclaimer, the term of this patent is extended or adjusted under 35 U.S.C. 154(b) by 771 days.

(21) Appl. No.: 13/316,574

(22) Filed: Dec. 12, 2011

(51) Int. Cl.
*H01Q 1/50* (2006.01)
*H01Q 1/52* (2006.01)

(52) U.S. Cl.
CPC ... *H01Q 1/50* (2013.01); *H01Q 1/52* (2013.01)

(58) Field of Classification Search
CPC ........................................................ H01Q 7/00
USPC ........................................................ 343/703
See application file for complete search history.

(56) References Cited

U.S. PATENT DOCUMENTS 7,554,339 B2   6/2009  Horton et al.
2010/0014571 A1*  1/2010  Horton et al. ................. 375/227

OTHER PUBLICATIONS

"Electromagnetic Reverberation Characteristics of a Large Transport Aircraft," Michael O. Hatfield NSWCDD/TR-93/339, Jul. 1994.*
Vincenzo Fiumara, Adele Fusco, Vincenzo Matta, and Innocenzo M. Pinto, "Free-Space Antenna Field/Pattern Retrieval in Reverberation Environments", IEEE Antennas and Wireless Propagation Letters, vol. 4, 2005, pp. 329-332.

* cited by examiner

*Primary Examiner* — Dameon E Levi
*Assistant Examiner* — Andrea Lindgren Baltzel
(74) *Attorney, Agent, or Firm* — McDonnell Boehnen Hulbert Berghoff LLP

(57) ABSTRACT

A method for determining a direct antenna coupling in a reverberant environment is disclosed. Radiowave energy is emitted in the reverberant environment from a transmitting antenna to a receiving antenna at a plurality of frequencies, and discrete frequency stirring data is collected at a plurality of frequencies. The discrete frequency stirring data is amplitude corrected and phase corrected using an expected amplitude shift and an expected phase shift at each of the frequencies to provide corrected discrete frequency stirring data. The direct antenna coupling is determined based on the corrected discrete frequency stirring data.

20 Claims, 4 Drawing Sheets

METHOD FOR DETERMINING AN ANTENNA PATTERN IN A REVERBERANT ENVIRONMENT

FIELD

Embodiments of the present disclosure relate generally to antennas. More particularly, embodiments of the present disclosure relate to determining an antenna pattern.

BACKGROUND

Traditional methods for determining antenna patterns use a controlled and expensive anechoic Radio Frequency (RF) environment, or an outdoor test facility. Since these facilities are few in number, they are generally expensive to operate and generally require long term planning to accommodate their busy test schedules.

SUMMARY

A method for determining a direct antenna coupling in a reverberant environment is disclosed. Radiowave energy is emitted in the reverberant environment from a transmitting antenna to a receiving antenna at a plurality of frequencies, and discrete frequency stirring data is collected at a plurality of frequencies. The discrete frequency stirring data is corrected using an expected phase shift and amplitude correction at each of the frequencies to provide corrected discrete frequency stirring data. The direct antenna coupling is determined based on the corrected discrete frequency stirring data.

In this manner, embodiments of the disclosure provide a method to calculate an antenna pattern from data collected in a sufficiently reverberant environment using discrete frequency stirring (DFS). The method removes a need for a controlled and expensive anechoic RF environment and allows antenna pattern data to be taken in any largely metallic room (e.g., a reverb chamber, a hanger such as a paint hangar, etc.) which is easier, faster, and cheaper to find and use for most organizations.

A benefit of using the method described herein over traditional antenna range methods is a cost savings associated with not needing to build and maintain, or acquire services of, an antenna range. The method described herein allows for use of a reverberant environment in order to collect data for finding an antenna pattern. Embodiments of the disclosure comprise using the DFS, and a post processing method to extract needed data from a complete dataset.

In an embodiment, a method for determining a direct antenna coupling in a reverberant environment emits radiowave energy in the reverberant environment from a transmitting antenna to a receiving antenna at a plurality of frequencies. The method further collects discrete frequency stirring data at each of the frequencies, and corrects the discrete frequency stirring data for amplitude and frequency phase shift using an expected amplitude shift and an expected phase shift at each of the frequencies to provide corrected discrete frequency stirring data. The method further determines the direct antenna coupling based on the corrected discrete frequency stirring data.

In another embodiment, a system for determining a direct antenna coupling in a reverberant environment comprises a transmitting antenna, a receiving antenna, and control logic. The transmitting antenna is operable to emit radiowave energy in the reverberant environment. The receiving antenna is operable to receive radiowave energy from the transmitting antenna in the reverberant environment. The control logic is operable to control emission of radiowave energy in the reverberant environment from the transmitting antenna to the receiving antenna at a plurality of frequencies. The control logic is further operable to collect discrete frequency stirring data at each of the frequencies, and correct the discrete frequency stirring data for amplitude shift and frequency phase shift using an expected amplitude shift and an expected phase shift at each of the frequencies to provide corrected discrete frequency stirring data. The control logic is further operable to determine the direct antenna coupling based on the corrected discrete frequency stirring data.

In a further embodiment, a computer readable storage medium comprising computer-executable instructions for performing a method for electrical power profile simulation. The method executed by the computer-executable instructions emits radiowave energy in the reverberant environment from a transmitting antenna to a receiving antenna at a plurality of frequencies. The method executed by the computer-executable instructions further collects discrete frequency stirring data at each of the frequencies, and corrects the discrete frequency stirring data for amplitude and frequency phase shift using an expected phase shift at each of the frequencies to provide corrected discrete frequency stirring data. The method executed by the computer-executable instructions further determines the direct antenna coupling based on the corrected discrete frequency stirring data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
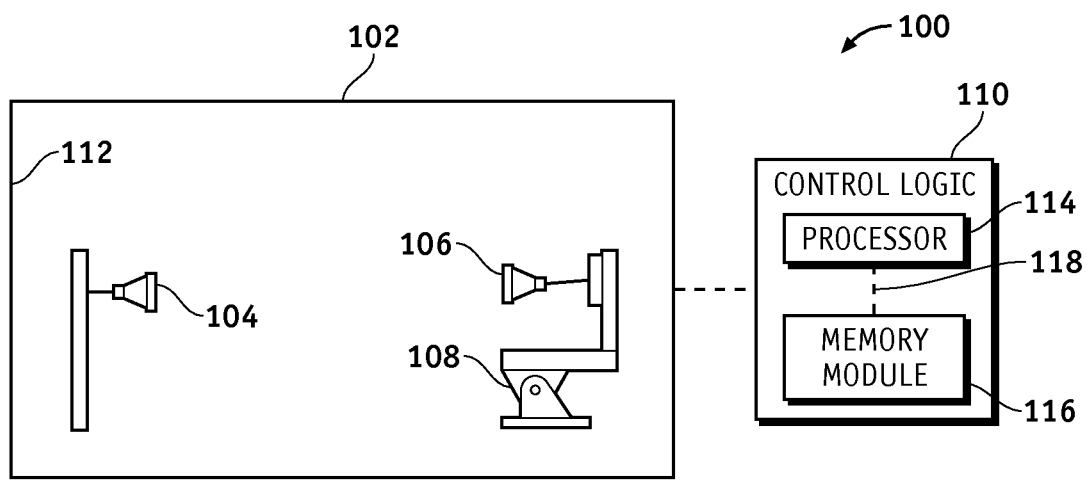
FIG. 1 is an illustration of an exemplary antenna test environment according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to antenna measurement, instrumentation, antenna patterning, discrete frequency stirring (DFS) and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, a horn antenna. Embodiments of the disclosure, however, are not limited to such horn antenna applications, and the techniques described herein may also be utilized in other applications. For example but without limitation, embodiments may be applicable to conformal antennas, manned and unmanned aircraft antennas, sensor antennas, radar antennas, a horn antenna, a Yagi-Uda antenna, a patch antenna, a parabolic antenna, a 3-dimensional antenna, a meta-material antenna, a dipole antenna, a balun antenna, a directional antenna, an omni-directional antenna, and other antennas.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

As mentioned above, embodiments of the disclosure provide a way to calculate an antenna pattern from data collected in a sufficiently reverberant environment using discrete frequency stirring (DFS). This method removes a need for a controlled and expensive anechoic RF environment and allows antenna pattern data to be taken in any largely metallic room such as, but without limitation, a reverb chamber, a hangar such as a paint hanger, or other largely metallic enclosed volume.

Antenna patterns for large or highly integrated antennas can be difficult to find using traditional methods; there are relatively few large antenna ranges, and most can be difficult to schedule and can be expensive. This method allows for determining an antenna radiation pattern from data taken in any sufficiently reverberant environment, which is easier, faster, and cheaper to find and use for most organizations.

Current methods for determining antenna patterns are by using an antenna range. Antenna ranges are expensive to build and maintain, especially ranges suitable for scanning larger antennas or systems. Two main types of antenna ranges are indoor and outdoor ranges. Indoor ranges require a lot of expensive absorber material, in addition to complex fire suppression systems in a fairly large space. Outdoor ranges require a large open space, and the range is limited by the available Federal Communications Commission (FCC) licenses and weather. Antenna ranges are expensive enough that generally few organizations other than dedicated for-hire organizations or large companies, that can afford a dedicated facility, will build and maintain one.

FIG. 1 is an illustration of an exemplary antenna reverberant test environment 100 (reverberant environment 100) according to an embodiment of the disclosure. The reverberant environment 100 comprises a test chamber 102, a tester antenna 104, an antenna-under-test 106, a testing mount 108, and control logic 110.

The test chamber 102 comprises a reverberant environment comprising multipath reflection surfaces 112.

The tester antenna 104 comprises an antenna for sending and/or receiving signals to/from the antenna-under-test 106. The tester antenna 104 may comprise, for example but without limitation, a horn antenna, a Yagi-Uda antenna, a patch antenna, a parabolic antenna, a 3-dimensional antenna, a meta-material antenna, a dipole antenna, a balun antenna, a directional antenna, an omni-directional antenna, or other antenna.

The antenna-under-test 106 comprises an antenna to be tested. The antenna-under-test 106 may comprise, for example but without limitation, a horn antenna, a Yagi-Uda antenna, a patch antenna, a parabolic antenna, a 3-dimensional antenna, a meta-material antenna, a dipole antenna, a balun antenna, a directional antenna, an omni-directional antenna, or other antenna. The antenna-under-test 106 is mounted on the testing mount 108 for testing.

The testing mount 108 is coupled to the antenna-under-test 106, and is operable to rotate the antenna-under-test 106 through a plurality of angles.

The control logic 110 is configured to control emission of radiowave energy in the reverberant environment such as the test chamber 102 from the transmitting antenna (e.g., the antenna-under-test 106/the tester antenna 104) to the receiving antenna (e.g., the antenna-under-test 106/the tester antenna 104) at a plurality of frequencies. The control logic 110 may step the radiowave energy through the frequency range in a plurality of frequency steps. The frequency steps may be based on the reverberant environment. A step size of the frequency steps may be larger than a resonant mode bandwidth of the reverberant environment.

The control logic 110 is further configured to collect discrete frequency stirring data at each of the frequencies, and calculate an expected amplitude shift and expected phase shift for each of the frequencies based on the discrete frequency stirring data. The control logic 110 is further configured to calculate an amplitude shift correction and phase shift correction for each of the frequencies based on the discrete frequency stirring data. The control logic 110 is further configured to determine the direct antenna coupling based on the expected amplitude shift and the expected phase shift for at least one of the frequencies as explained in more detail below.

The control logic 110 comprises processing logic that is configured to carry out the functions, techniques, and processing tasks associated with the operation of the reverberant environment 100. In particular, the processing logic is configured to support the reverberant environment 100 described above.

The control logic 110 also accesses data stored in the memory module 116, to support functions of the reverberant environment 100. Thereby, the control logic 110 enables method of determining antenna patterns of the reverberant environment 100. The data may comprise, for example but without limitation, discrete frequency stirring data, a starting frequency point, an ending frequency point, expected phase shift at each of the frequencies, and other data as explained in more detail below.

The control logic 110 may be implemented, or realized, with a general purpose processor such as a processor 114, a content addressable memory such as the memory module 116, a digital signal processor, an application specific integrated circuit, a field programmable gate array, any suitable programmable logic device, discrete gate or transistor logic, discrete hardware components, or any combination thereof, designed to perform the functions described herein. In this manner, the control logic 110 may be realized as a microprocessor, a controller, a microcontroller, a state machine, or the like. The control logic 110 may also be implemented as a combination of computing devices, e.g., a combination of a digital signal processor and a microprocessor, a plurality of microprocessors, one or more microprocessors in conjunction with a digital signal processor core, or any other such configuration.

The control logic 110 may be comprised in, for example but without limitation, a desktop, a laptop or notebook computer, a hand-held computing device (e.g., PDA, cell phone, palmtop, etc.), a mainframe, a server, a client, or any other type of special or general purpose computing device as may be desirable or appropriate for a given application or environment. A practical control logic 110 may comprise any number of processors, any number of memory modules, and any number of computational modules. The illustrated control logic 110 depicts a simple embodiment for ease of description. These and other elements of the control logic 110 are interconnected together, allowing communication between the various elements of the control logic 110. In one embodiment, these and other elements of the control logic 110 may be interconnected together via a communication link 118.

Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The various illustrative blocks, modules, processing logic, and circuits described in connection with the control logic 110 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The processor 114 may be realized as a microprocessor, a controller, a microcontroller, or a state machine. The processor 114 may also be implemented as a combination of computing devices, e.g., a combination of a digital signal processor and a microprocessor, a plurality of microprocessors, one or more microprocessors in conjunction with a digital signal processor core, or any other such configuration.

The memory module 116 may be a data storage area with memory formatted to support the operation of the reverberant environment 100. The memory module 116 is configured to store, maintain, and provide data as needed to support the functionality of the reverberant environment 100 in the manner described below. In practical embodiments, the memory module 116 may comprise, for example but without limitation, a non-volatile storage device (e.g., non-volatile semiconductor memory, hard disk device, optical disk device, and the like), a random access storage device (e.g., SRAM, DRAM, etc.), or any other form of storage medium known in the art.

The memory module 116 may be coupled to the processor 114 and configured to store the data described above. Additionally, the memory module 116 may represent a dynamically updating database containing a table for updating the data in various databases. The memory module 116 may also store, a computer program that is executed by the processor 114/the control logic 110, an operating system, an application program, tentative data used in executing a program, or other application.

The memory module 116 may be coupled to the processor 114 such that the processor 114 can read information from and write information to the memory module 116. As an example, the control logic 110 and memory module 116 may reside in respective application specific integrated circuits (ASICs). The memory module 116 may also be integrated into the control logic 110. In an embodiment, the memory module 116 may comprise a cache memory for storing temporary variables or other intermediate information during execution of instructions to be executed by the processor 114.

Figure 2:
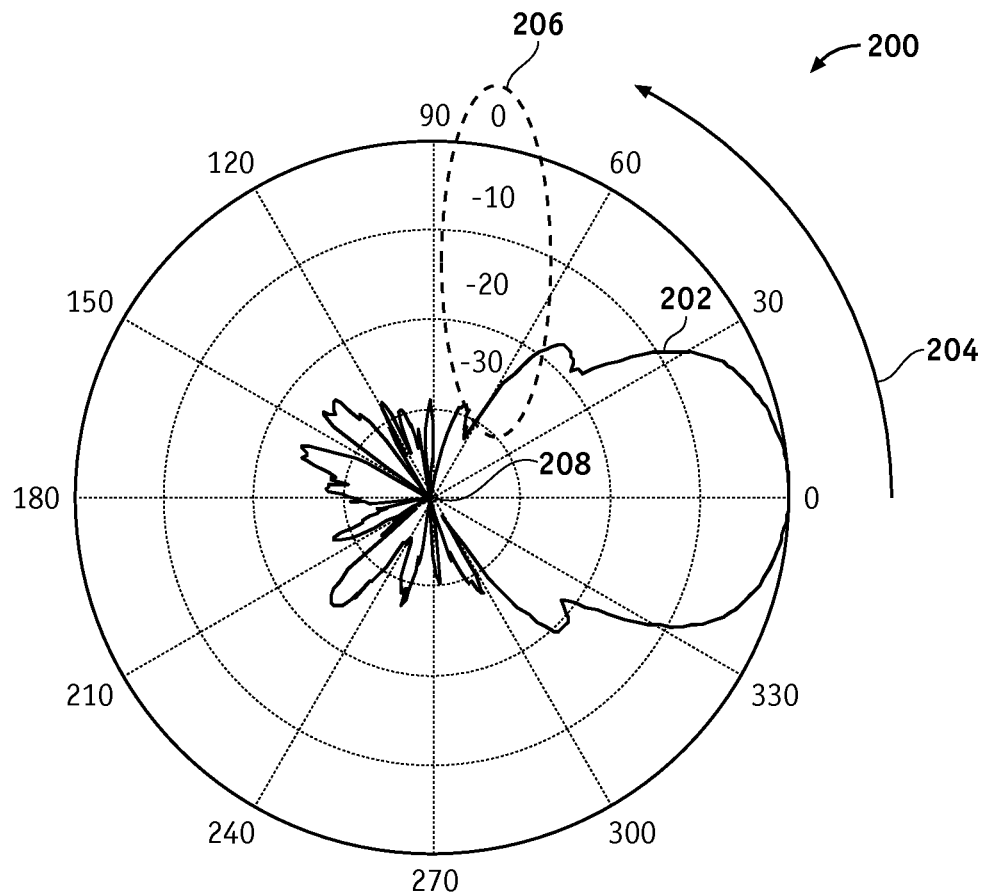
FIG. 2 is an illustration of an exemplary amplitude-angle polar diagram showing a direct antenna coupling for a plurality of antenna direction angles according to an embodiment of the disclosure.

FIG. 2 is an illustration of an exemplary amplitude-angle polar diagram 200 (polar diagram 200) showing a direct antenna coupling amplitude 202 for a plurality of antenna direction angles 204. The polar diagram 200 shows radiation patterns of an antenna. The radiation patterns are graphical representation of the electromagnetic power distribution in free space which can be considered to be reprehensive of the relative field strength of a field radiated from the antenna. The direct antenna coupling amplitude 202 is measured in dBm. The amplitude 202 is measured in a scale of −30 dBm to 0 dBm in steps of 10 dBm increments from the origin 208. A scale of FIG. 2 is collectively known as the distance 206.

Figure 3:
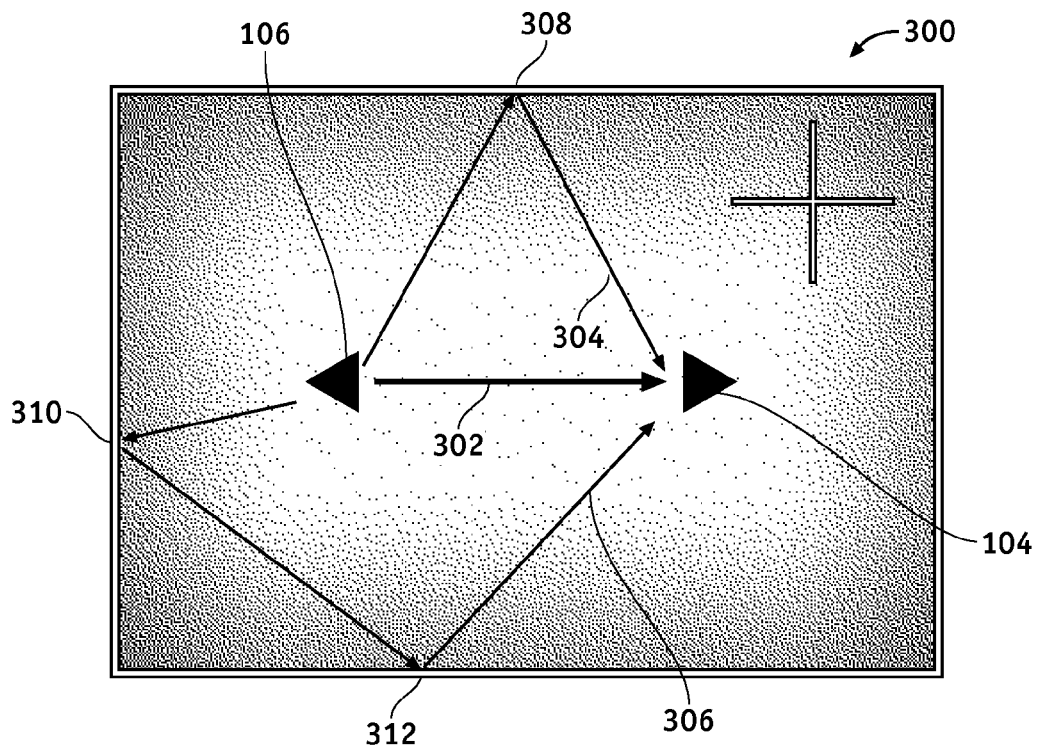
FIG. 3 is an illustration of an exemplary antenna at a first angle in a reverberant antenna test environment according to an embodiment of the disclosure.

FIG. 3 is an illustration of an exemplary antenna-under-test 106 at a first angle in a reverberant antenna test environment 300 (reverberant environment 300) according to an embodiment of the disclosure. In the embodiment shown in FIG. 3, the radiowave energy is transmitted via a transmitted signal from the antenna-under-test 106 to the tester antenna 104. Alternatively, the radiowave energy may be transmitted via a transmitted signal from the tester antenna 104 to the antenna-under-test 106.

A direct antenna coupling 302 comprises radiowave energy coupling of the tester antenna 104 and the antenna-under-test 106. Radiowave energy from the antenna-under-test 106 is also reflected off other surfaces before reaching the tester antenna 104. For example, a multipath reflection 304 may be reflected off a wall 308 of the reverberant environment 300 before reaching the tester antenna 104. For another example, a multipath reflection 306 may be reflected off a wall 310 and a wall 312 of the reverberant environment 300 before reaching the tester antenna 104.

A frequency of a signal emitted (or received) from the antenna-under-test 106 to (from) the tester antenna 104 may be swept through a plurality of frequencies. As the frequency of the signal is swept, a phase of a multipath reflection such as the multipath reflection 304 and the multipath reflection 306 change phase relative to the direct antenna coupling 302.

Figure 4:
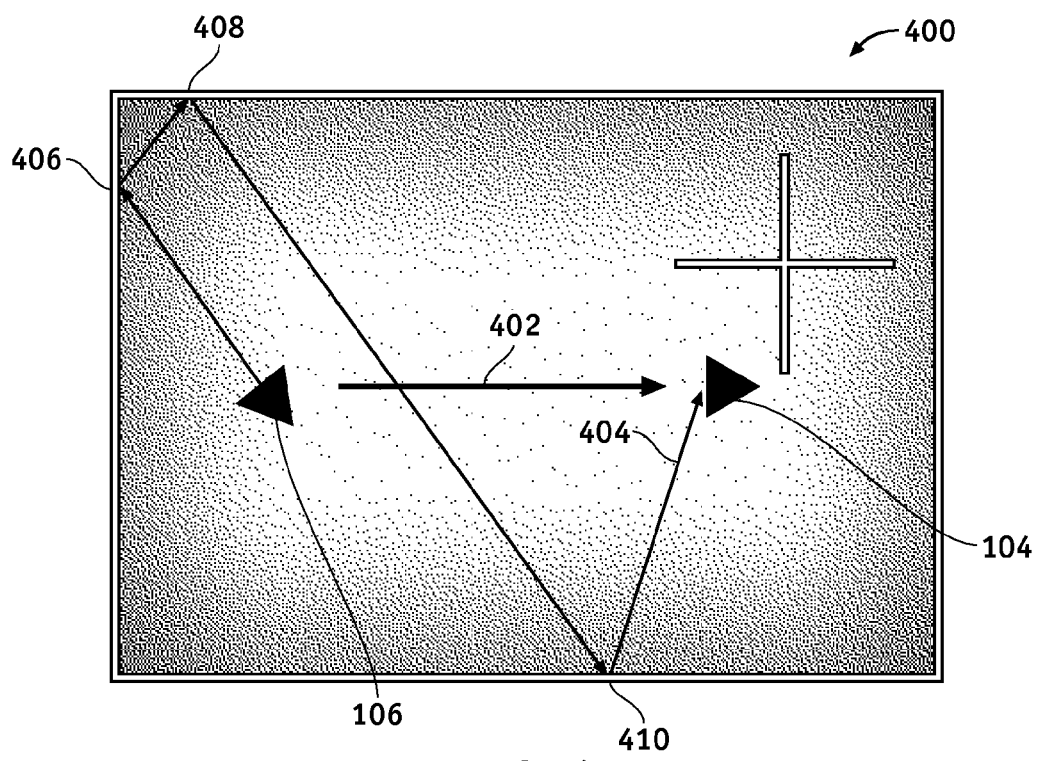
FIG. 4 is an illustration of an exemplary antenna at a second angle in a reverberant antenna test environment according to an embodiment of the disclosure.

FIG. 4 is an illustration of an exemplary antenna-under-test 106 at a second angle in a reverberant antenna test environment 400 (reverberant environment 400) according to an embodiment of the disclosure. The antenna-under-test 106 is pointed toward a reflection point 406 and away from the tester antenna 104. A direct antenna coupling 402 comprises radiowave energy coupling of the tester antenna 104 and the antenna-under-test 106. Radiowave energy from the antenna-under-test 106 is also reflected off other surfaces before reaching the tester antenna 104. For example, a multipath reflection 410 may be reflected off a wall 408 of the reverberant environment 400 before reaching the tester antenna 104.

Figure 5:
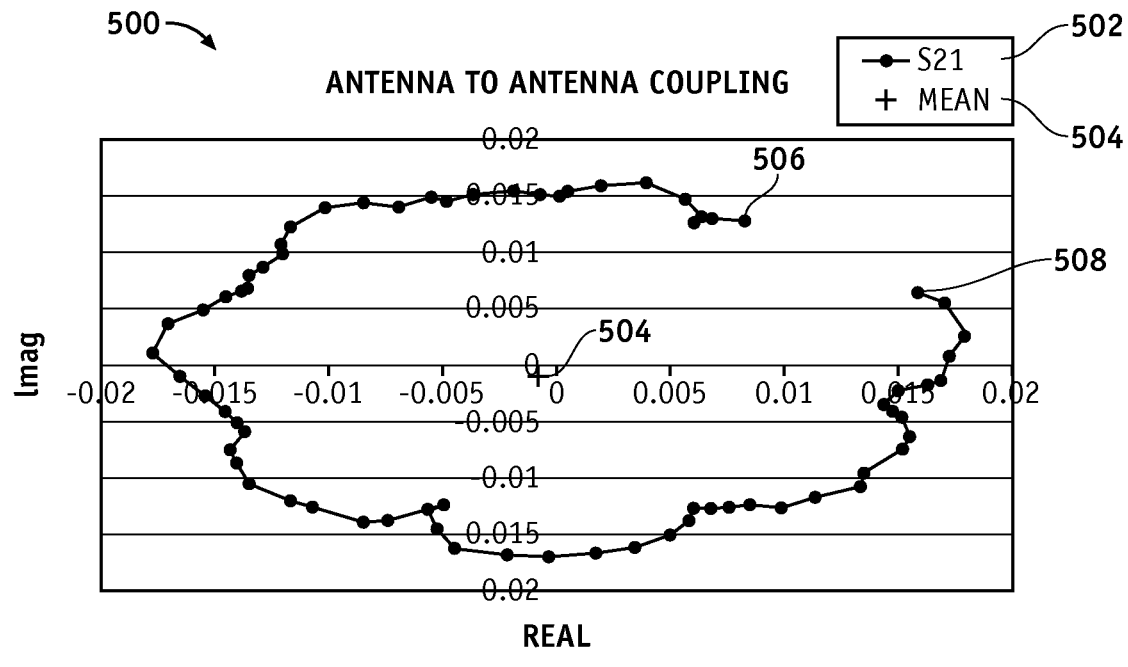
FIG. 5 is an illustration of an exemplary measured direct antenna coupling graph for a plurality of frequencies according to an embodiment of the disclosure.

FIG. 5 is an illustration of an exemplary measured direct antenna coupling graph 500 in a complex variable coordinates (Real and Imaginary) for a plurality of frequencies according to an embodiment of the disclosure. The measured direct antenna coupling graph 500 shows a plurality of measured direct antenna coupling data points 502 (forward s-parameter $S_{21}$) measured at a plurality of frequency points starting from a starting frequency point 506 and ending at an ending frequency point 508. The measured direct antenna coupling data points 502 comprise discrete frequency stirring data collected at each of the frequencies.

The measured direct antenna coupling data points 502 (e.g., discrete frequency stirring data) are corrected for amplitude shift and frequency phase shift using an expected amplitude shift and an expected phase shift at each of the frequencies to provide corrected discrete frequency stirring data. The expected amplitude shift may be calculated by, for example but without limitation, averaging measured data, correlating amplitude shift to frequency from measured data, regression fitting a relation between amplitude shift to frequency from measured data, a priori calculation, or other method. The expected phase shift may be calculated by, for example but without limitation, correlating phase shift to frequency from measured data, regression fitting a relation between phase shift to frequency from measured data, a priori calculation, or other method.

A direct antenna coupling corrected for phase to eliminate multipath may be determined based on the corrected discrete frequency stirring data using the following formula:

$$P_{cor} e_i^{j(\theta_{21} - \theta_{cor})}, \quad (1)$$

where $\theta_{cor}$ is a phase shift correction, $\theta_{21}$ is a phase angle of an s-parameter for a point i, and $P_{cor}$ is an amplitude shift correction. The amplitude shift correction may be calculated as follows:

$$P_{cor} = \frac{\langle |s_{21}|^2 \rangle}{1 - |\langle s_{11} \rangle|^2}, \text{ or } P_{cor} = \frac{\langle |s_{11}|^2 \rangle}{(1 - |\langle s_{11} \rangle|^2)(1 - |\langle s_{22} \rangle|^2)},$$

where $s_{11}$ is a reflection s-parameter of the transmitted signal, $s_{22}$ is a reflection s-parameter of the received signals, $\langle s_{11} \rangle$ is an average of the reflection of the transmitted signal for each measurement of the transmitted signal (e.g., for each transmission angle), $\langle s_{22} \rangle$ is an average of the reflection of the received signal for each measurement of the transmitted signal (e.g., for each transmission angle), $s_{21}$ is a forward s-parameter of the transmitted signal, and $\langle s_{21} \rangle$ is an average of the transmitted signal for each measurement of the transmitted signal (e.g., for each transmission angle).

The $P_{cor}$ is an amplitude shift correction for an amplitude shift from an origin 606 (FIG. 6) of a mean 504 (amplitude shift 504) of the measured direct antenna coupling data points 502. The $\theta_{cor}$ is a phase correction for an expected phase shift for a point i at a frequency at which the point i is measured.

Figure 6:
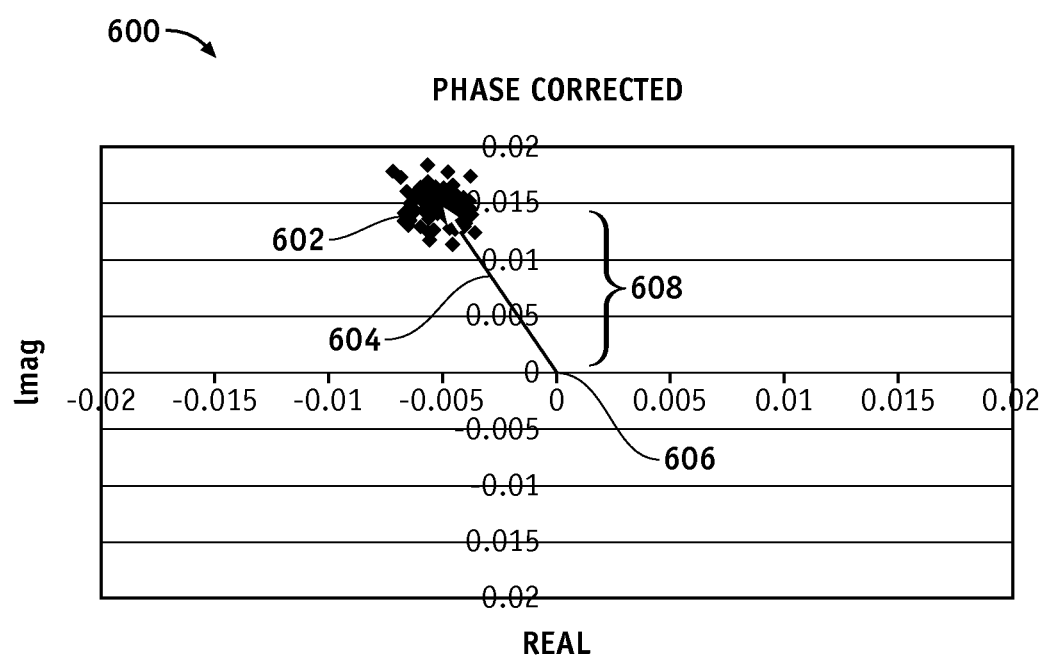
FIG. 6 is an illustration of an exemplary graph showing a direct antenna coupling corrected for phase and amplitude to eliminate multipath according to an embodiment of the disclosure.

FIG. 6 is an illustration of an exemplary graph 600 showing amplitude and phase corrected direct antenna coupling data points 602 each corrected for amplitude and phase to eliminate a multipath according to an embodiment of the disclosure. The measured direct antenna coupling data points 502 of FIG. 5 are each amplitude shift and phase shift corrected to provide the amplitude and phase corrected direct antenna coupling data points 602. After correcting for amplitude shift and phase shift introduced by DFS, the corrected direct antenna coupling data points 602 still comprise measured variation.

A measured direct antenna coupling 604 comprises a direct coupling component 608 of the corrected direct antenna coupling data points 602. The direct coupling component 608 comprises a systematic component of the amplitude and phase corrected direct antenna coupling data points 602. The systematic component of the amplitude and phase corrected direct antenna coupling data points 602 may be calculated based on the following relationship:

$$\text{Systematic Component} = \sqrt{\overline{R}^2 + \overline{Im}^2} = \langle S_{21} \rangle$$

where $s_{21}$ is a forward s-parameter of the transmitted signal, and $\langle s_{21} \rangle$ is an average of the transmitted signal for each measurement of the transmitted signal (e.g., for each transmission angle), and $\overline{R}$ and $\overline{Im}$ are real and imaginary components of $\langle s_{21} \rangle$.

A random component of the amplitude and phase corrected direct antenna coupling data points 602 may be calculated based on the following relationship:

$$\text{Random Component} = |S_{21} - \langle S_{21} \rangle|^2$$

A ratio K of the systematic component to the random component of the amplitude and phase corrected direct antenna coupling data points 602 may be used as a measure of a measurement variation relative to the direct coupling component 608. The ratio K maybe determined by the following relation:

$$K = \frac{\text{Systematic}}{\text{Random}} =$$

$$\frac{d_R^2}{2\sigma_R^2} = \frac{(|\langle s_{21} \rangle|)^2}{\langle |s_{21} - \langle s_{21} \rangle| \rangle} = \frac{|\langle P_{cor} e_i^{j\theta_{21} - \theta_{cor}} \rangle|^2}{\langle |P_{cor} e_i^{j\theta_{21} - \theta_{cor}} - \langle P_{cor} e_i^{j\theta_{21} - \theta_{cor}} \rangle|^2 \rangle},$$

where $|\langle S_{21} \rangle|^2$ is a vector average, $\langle |S_{21}|^2 \rangle$ is a scalar average, $d_R^2$ is a radial distance $d_R$ from the origin 606, and $2\alpha_R^2$ is a variance of the radial distance $d_R$.

Figure 7:
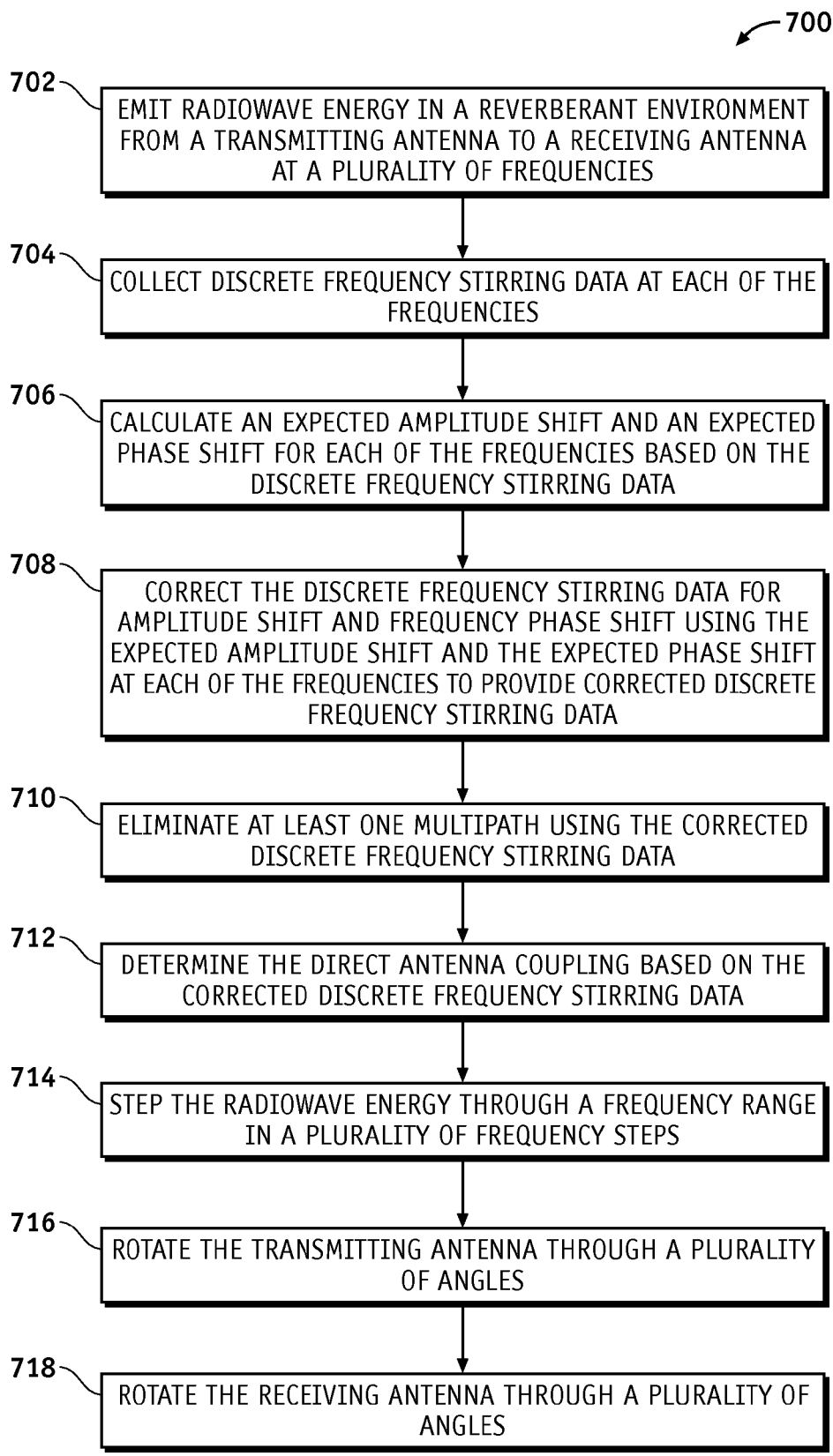
FIG. 7 is an illustration of an exemplary flowchart showing a process for determining a direct antenna coupling in a reverberant environment according to an embodiment of the disclosure.

FIG. 7 is an illustration of an exemplary flowchart showing a process 700 for determining a direct antenna coupling in a reverberant environment according to an embodiment of the disclosure. The various tasks performed in connection with process 700 may be performed mechanically, by software, hardware, firmware, or any combination thereof. It should be appreciated that process 700 may include any number of additional or alternative tasks, the tasks shown in FIG. 7 need not be performed in the illustrated order, and the process 700 may be incorporated into a more comprehensive procedure or process having additional functionality not described in detail herein.

For illustrative purposes, the following description of process 700 may refer to elements mentioned above in connection with FIGS. 1-4. In practical embodiments, portions of the process 700 may be performed by different elements of the reverberant environment 100/300/400 such as: the test chamber 102, the tester antenna 104, the antenna-under-test 106, the testing mount 108, the control logic 110, etc. The process 700 may have functions, material, and structures that are similar to the embodiments shown in FIGS. 1, 3, and 4 and the graphs shown in FIGS. 2, 5 and 6. Therefore common features, functions, and elements may not be redundantly described here.

Process 700 may begin by emitting radiowave energy in a reverberant environment such as the reverberant environment 100/300/400 from a transmitting antenna such as the antenna-under-test 106/the tester antenna 104 to a receiving antenna such as the antenna-under-test 106/the tester antenna 104 at a plurality of frequencies (task 702).

Process 700 may continue by collecting discrete frequency stirring data at each of the frequencies (task 704).

Process 700 may continue by calculating an expected amplitude shift and an expected phase shift for each of the frequencies based on the discrete frequency stirring data (task 706).

Process 700 may continue by correcting the discrete frequency stirring data for amplitude shift and frequency phase shift using the expected amplitude shift and the expected phase shift at each of the frequencies to provide corrected discrete frequency stirring data (task 708).

Process 700 may continue by eliminating at least one multipath using the corrected discrete frequency stirring data (task 710).

Process 700 may continue by determining a direct antenna coupling such as the direct antenna coupling 302 based on the corrected discrete frequency stirring data (task 712).

Process 700 may continue by stepping the radiowave energy through the frequency range in a plurality of frequency steps (task 714). The frequency steps may be based on the reverberant environment. A step size of the frequency steps may be larger than a resonant mode bandwidth of the reverberant environment.

Process 700 may continue by rotating the transmitting antenna through a plurality of angles (task 716).

Process 700 may continue by rotating the receiving antenna through a plurality of angles (task 718).

In this manner, embodiments of the disclosure provide a way to calculate an antenna pattern from data collected in a sufficiently reverberant environment using discrete frequency stirring (DFS). This method removes a need for a controlled and expensive anechoic RF environment and allows antenna pattern data to be taken in any largely metallic room (e.g., reverb chamber, paint hangar, etc).

As mentioned above, a benefit of using this method over the traditional antenna range methods is the cost savings associated with not needing to build and maintain, or acquire the services of, an antenna range. This method allows for the use of any sufficiently reverberant environment in order to collect data for finding an antenna pattern. The novel features of this method are the use of DFS, and the post processing method to extract the needed data from the complete dataset.

In this document, the terms "computer program product", "computer-readable medium", computer readable storage medium and the like may be used generally to refer to media such as, for example, memory, storage devices, or storage unit. These and other forms of computer-readable media may be involved in storing one or more instructions for use by the control logic 110 and/or the processor 114 to cause the control logic 110 or the processor 114 to perform specified operations. Such instructions, generally referred to as "computer program code" or "program code" (which may be grouped in the form of computer programs or other groupings), when executed, enable a method of determining a direct antenna coupling in the reverberant environment 100/300/400.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1 and 3-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for determining a direct antenna coupling in a reverberant environment, the method comprising:
   emitting radiowave energy in the reverberant environment from a transmitting antenna to a receiving antenna at a plurality of frequencies, wherein the reverberant environment comprises reflection surfaces entirely enclosing the transmitting antenna and the receiving antenna;

collecting discrete frequency stirring data at each of the frequencies and at each of a plurality of angles to provide collected discrete frequency stirring data;

correcting the collected discrete frequency stirring data for amplitude shift and frequency phase shift after all the collected discrete frequency stirring data has been measured using an expected amplitude shift and an expected phase shift at each of the frequencies and each of the angles to provide corrected discrete frequency stirring data;

determining the direct antenna coupling based on the corrected discrete frequency stirring data; and determining at least one antenna pattern based on determined direct antenna coupling.

2. The method of claim 1, further comprising calculating the expected amplitude shift and the expected phase shift for each of the frequencies based on the discrete frequency stirring data.

3. The method of claim 1, further comprising eliminating at least one multipath using the corrected discrete frequency stirring data.

4. The method of claim 1, further comprising stepping the radiowave energy through a frequency range in a plurality of frequency steps.

5. The method of claim 4, wherein the frequency steps are based on the reverberant environment.

6. The method of claim 5, wherein a step size of the frequency steps is based on a resonant mode bandwidth of the reverberant environment.

7. The method of claim 1, further comprising rotating the transmitting antenna through the plurality of angles.

8. The method of claim 1, further comprising rotating the receiving antenna through the plurality of angles.

9. A system for determining a direct antenna coupling in a reverberant environment, the system comprising:

a transmitting antenna operable to emit radiowave energy in the reverberant environment;

a receiving antenna operable to receiving radiowave energy from the transmitting antenna in the reverberant environment, wherein the reverberant environment comprises reflection surfaces entirely enclosing the transmitting antenna and the receiving antenna; and control logic operable to:

control emission of radiowave energy in the reverberant environment from the transmitting antenna to the receiving antenna at a plurality of frequencies;

collect discrete frequency stirring data at each of the frequencies and at each of a plurality of angles to provide collected discrete frequency stirring data;

correct the collected discrete frequency stirring data for amplitude shift and frequency phase shift after all the collected discrete frequency stirring data has been measured using an expected amplitude shift and an expected phase shift at each of the frequencies and each of the angles to provide corrected discrete frequency stirring data;

determine the direct antenna coupling based on the corrected discrete frequency stirring data; and determine at least one antenna pattern based on determined direct antenna coupling.

10. The system of claim 9, wherein the control logic is further operable to calculate the expected amplitude shift and the expected phase shift for each of the frequencies based on the discrete frequency stirring data.

11. The system of claim 9, wherein the control logic is further operable to eliminate at least one multipath using the corrected discrete frequency stirring data.

12. The system of claim 9, wherein the control logic is further operable to rotate the transmitting antenna through a plurality of angles.

13. The system of claim 9, further comprising rotating the receiving antenna through the plurality of angles.

14. A computer readable storage medium comprising computer-executable instructions for performing a method for determining a direct antenna coupling in a reverberant environment, the method executed by the computer-executable instructions comprising:

emitting radiowave energy in the reverberant environment from a transmitting antenna to a receiving antenna at a plurality of frequencies, wherein the reverberant environment comprises reflection surfaces entirely enclosing the transmitting antenna and the receiving antenna;

collecting discrete frequency stirring data at each of the frequencies and at each of a plurality of angles to provide collected discrete frequency stirring data;

correcting the collected discrete frequency stirring data for amplitude shift and frequency phase shift after all the collected discrete frequency stirring data has been measured using an expected amplitude shift and an expected phase shift at each of the frequencies and each of the angles to provide corrected discrete frequency stirring data;

determining the direct antenna coupling based on the corrected discrete frequency stirring data; and determining at least one antenna pattern based on determined direct antenna coupling.

15. The computer readable storage medium of claim 14, the method executed by the computer-executable instructions, further comprising calculating the expected amplitude shift and expected phase shift for each of the frequencies based on the discrete frequency stirring data.

16. The computer readable storage medium of claim 14, the method executed by the computer-executable instructions, further comprising eliminating at least one multipath using the corrected discrete frequency stirring data.

17. The computer readable storage medium of claim 14, the method executed by the computer-executable instructions, further comprising stepping the radiowave energy through a frequency range in a plurality of frequency steps.

18. The computer readable storage medium of claim 17, the method executed by the computer-executable instructions, wherein the frequency steps are based on the reverberant environment.

19. The computer readable storage medium of claim 14, the method executed by the computer-executable instructions, further comprising rotating the transmitting antenna through the plurality of angles.

20. The computer readable storage medium of claim 14, the method executed by the computer-executable instructions, further comprising rotating the receiving antenna through the plurality of angles.

* * * * *